(12) United States Patent
Cowan et al.

(10) Patent No.: US 11,619,321 B2
(45) Date of Patent: *Apr. 4, 2023

(54) TWO-STEP TURN ON FOR DIGITAL GAS VALVES

(71) Applicant: Midea Group Co., Ltd., Foshan (CN)

(72) Inventors: Richard W. Cowan, Louisville, KY (US); Nathan E. Nelson, Louisville, KY (US); Daniel J. Trice, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/579,113

(22) Filed: Jan. 19, 2022

(65) Prior Publication Data

US 2022/0136617 A1 May 5, 2022

Related U.S. Application Data

(63) Continuation of application No. 16/588,282, filed on Sep. 30, 2019, now Pat. No. 11,255,460.

(51) Int. Cl.
*F16K 31/60* (2006.01)
*G05G 5/28* (2006.01)
*F24C 3/12* (2006.01)

(52) U.S. Cl.
CPC .............. *F16K 31/60* (2013.01); *F24C 3/126* (2013.01); *G05G 5/28* (2013.01)

(58) Field of Classification Search
CPC .. F24C 3/12; F24C 3/122; F24C 3/124; F24C 3/126; F16K 31/60; G05D 5/28; G05D 1/08
See application file for complete search history.

(56) References Cited

U.S. PATENT DOCUMENTS

| | | |
|---|---|---|
| 3,963,410 A | 6/1976 | Baysinger |
| 4,930,488 A | 6/1990 | Pearman et al. |
| 5,241,463 A | 8/1993 | Lee |
| 5,530,230 A | 6/1996 | Smith et al. |
| 5,575,638 A | 11/1996 | Witham et al. |
| 5,662,465 A | 9/1997 | Kano |
| 5,791,890 A | 8/1998 | Maughan |
| 5,875,773 A | 3/1999 | Jansen |
| 5,924,857 A | 7/1999 | Frasnetti et al. |
| 5,975,072 A | 11/1999 | Garceau et al. |
| 6,992,258 B2 | 1/2006 | Vieira |
| 7,479,006 B2 | 1/2009 | Newsom |

(Continued)

FOREIGN PATENT DOCUMENTS

| | | |
|---|---|---|
| CN | 201531923 U | 7/2010 |
| CN | 104033924 A | 9/2014 |

(Continued)

OTHER PUBLICATIONS

U.S. Patent and Trademark Office, Advisory Action issued in U.S. Appl. No. 16/889,234 dated May 12, 2022.

(Continued)

*Primary Examiner* — Umashankar Venkatesan

(74) *Attorney, Agent, or Firm* — Gray Ice Higdon

(57) ABSTRACT

A system for a two-step activation for a valve includes at least one valve control selector having an output representative of a valve position and a touch sensor having an output representative of a permission to operate said valve.

20 Claims, 3 Drawing Sheets

(56) References Cited

U.S. PATENT DOCUMENTS

| | | |
|---|---|---|
| 7,642,673 B2 | 1/2010 | Baier |
| 7,798,139 B2 | 9/2010 | Gagas et al. |
| 7,978,186 B2 | 7/2011 | Vassallo et al. |
| 8,587,444 B2 | 11/2013 | Cadima |
| 8,766,910 B2 | 7/2014 | Grivna |
| 2004/0069293 A1 | 4/2004 | Steurer |
| 2005/0115697 A1 | 6/2005 | Landry et al. |
| 2005/0236392 A1 | 10/2005 | Blackson et al. |
| 2008/0108002 A1 | 5/2008 | Huang |
| 2009/0104573 A1 | 4/2009 | Chen |
| 2009/0189747 A1 | 7/2009 | Baier et al. |
| 2011/0294078 A1 | 12/2011 | Gärtner et al. |
| 2012/0171343 A1 | 7/2012 | Cadima et al. |
| 2012/0305820 A1 | 12/2012 | Bollman et al. |
| 2014/0199641 A1 | 7/2014 | Chian et al. |
| 2015/0374163 A1 | 12/2015 | Spand et al. |
| 2018/0084937 A1 | 3/2018 | Joo et al. |
| 2018/0340692 A1 | 11/2018 | Kwag et al. |
| 2019/0125120 A1 | 5/2019 | Jenkins et al. |
| 2019/0170364 A1 | 6/2019 | Ha et al. |
| 2020/0088411 A1 | 3/2020 | Cowan et al. |
| 2021/0095784 A1 | 4/2021 | Cowan et al. |
| 2021/0095855 A1 | 4/2021 | Cowan |

FOREIGN PATENT DOCUMENTS

| | | |
|---|---|---|
| CN | 204438219 U | 7/2015 |
| CN | 104976646 A | 10/2015 |
| CN | 105008807 A | 10/2015 |
| CN | 105928018 A | 9/2016 |
| CN | 109140534 A | 1/2019 |
| CN | 208794462 U | 4/2019 |
| EP | 2230461 A2 | 9/2010 |
| WO | WO2010039439 A3 | 7/2010 |

OTHER PUBLICATIONS

U.S. Patent and Trademark Office, Notice of Allowance issued in U.S. Appl. No. 16/889,234 dated Jun. 9, 2022.

U.S. Patent and Trademark Office, Final Office Action issued in U.S. Appl. No. 16/889,234 dated Feb. 23, 2022.

Lee "This Smart Knob Upgrades Your Stove with Automatic Temperature Controls" https://www.engadget.com/2015/04/07/meld-knob-clip/ Apr. 2015.

International Search Report and Written Opinion issued in Application No. PCT/CN2020/097873, dated Sep. 27, 2020.

U.S. Patent and Trademark Office, Office Action issued in U.S. Appl. No. 16/588,282 dated Feb. 4, 2021.

U.S. Patent and Trademark Office, Final Office Action issued in U.S. Appl. No. 16/588,282 dated Jul. 15, 2021.

International Search Report and Written Opinion issued in Application No. PCT/CN2021/097352, dated Aug. 24, 2021.

U.S. Patent and Trademark Office, Advisory Action issued in U.S. Appl. No. 16/588,282 dated Oct. 29, 2021.

U.S. Patent and Trademark Office, Non-Final Office Action issued in U.S. Appl. No. 16/889,234 dated Nov. 18, 2021.

U.S. Patent and Trademark Office, Notice of Allowance issued in U.S. Appl. No. 16/588,282 dated Nov. 29, 2021.

U.S. Patent and Trademark Office, Notice of Allowance issued in U.S. Appl. No. 16/588,282 dated Jan. 6, 2022.

TWO-STEP TURN ON FOR DIGITAL GAS VALVES

BACKGROUND OF THE INVENTION

In appliance manufacturing industries generally, and specifically in the range or cooking appliance manufacturing industries, most appliances such as cooktops or ranges have a variety of control or selector knobs for adjusting and controlling the amount of heat supplied to the various appliance burners or heating elements. Typically, these knobs are easily accessible to the average user, thereby making them simple and quick to operate, but also providing ready access to children and others lacking the requisite judgment to safely operate the appliance.

In order to provide a measure of safety to oven and cooktop appliances, manufacturers have equipped some control knobs and selectors with simple lockout mechanisms. For example, some control knobs are mounted on spring-loaded shafts that require a user to push or depress the knob slightly before it will turn, thereby providing at least a small measure of child-safety lockout protection. Gas appliances are typically equipped with these push-unlock valves as a mechanism to prevent accidental valve operation but they do not offer a reliable safety lockout mechanism.

Household cooking gas appliances in the United States are certified to the ANSI Z21.1 standard. This standard states that "Any manual gas valve or energy controlling device intended for use during normal operation and that has an off position to shut off the gas to a main burner or the energy flow to a heating element shall necessitate not less than two separate manual operations to turn on and shall necessitate only one manual operation to turn off." Typically, many standard manual gas valves are made to open from the closed position by first pushing in and then turning, for example.

However, many appliances utilize "digital" gas valves wherein a control knob is connected or secured to an electrical component, for example a resolver or encoder, that then translates the rotational position of the valve into an electrical signal representative of desired valve positioned to an electrically actuated gas valve to control the burner. In the case of these digital valves there is a need to design a method of interface for the user to command the valves to open and close, incorporating at least two manual operations to open and only one to close, in order to provide safe operation of the valves and concomitant burners.

Prior art digital gas systems generally utilize use a system of touch controls for safety purposes. For example, a user may touch a button or control panel switch to select a burner, then touch another button to ignite it and others to raise and lower the power level. Various other child lockout systems have been provided in the industry, with varying degrees of safety and operability. There does not exist, however, a reliable system for providing child safety control to an appliance that simultaneously provides ease of access and use for an adult user and permits a user to configure the operation of the burner and valve.

From the foregoing it can readily be seen that there is a need in the art for a gas valve control system that utilizes a multi-step process, for example a two-step turn on process and concomitant knob or actuator system that can be employed with individual appliances to control access to appliance controls without hampering the ability to use the appliance.

SUMMARY OF THE INVENTION

The present disclosure is related to systems and apparatus for providing two step turn on operation for a digital gas valve control for an appliance. The system described herein utilizes a knob or selector assembly mounted in the appliance that may be selectively touched and rotated. In some aspects and embodiments the system described may include a knob or selector assembly that may be clicked and/or rotated.

The control knobs or selectors in accordance with some aspects may be configured by a user utilizing an operator interface to define or select two or more turn on operations for valve operation. Additionally, the control knobs or selectors may be configured or customized individually, thereby providing safe operation of the appliance controls and providing a system for safely operating the gas valves thereof.

In various embodiments, the system disclosed herein provides a two-step configurable knob control that, when activated, provides a user defined operation to at least one control knob to operate an appliance gas valve to an open position. In other aspects and embodiments a knob or selector may be programmable for access and activation on a user interface, or alternatively a remotely located selector button or switch may be provided for one step of the two-step process to actuate a valve.

In various aspects and embodiments the system described herein may include a processor having a plurality of inputs and outputs that are operatively coupled to various components of an appliance, including a user interface and a pushbutton, switch or touch sensor. In some embodiments processor may be coupled with a user interface that is suitably programmed to provide a configurable control selector that may be initiated by a user to configure the control.

As used herein for purposes of the present disclosure, the term "appliance" should be understood to be generally synonymous with and include any device that consumes electrical power and can be connected to an electrical circuit or battery, for example one used in a residential or commercial setting to accomplish work. The appliances referred to herein may include a plurality of electrically operated components powered by the circuit, the components operable by manipulation of control knobs or selectors. The appliances referred to herein may also include a gas supply or source and one or more gas valves for supplying gas to a burner or heating element. The appliance gas valves may be controlled by a selector or knob, either directly or indirectly, and the appliance may also include a processor or processors that operate, control and monitor the appliance and the various components and functions thereof referred to throughout this specification.

The terms "knob" or "selector" are used herein generally to describe various devices that are operatively coupled to functional components of the appliance and which may typically, but not exclusively, be operated by hand by a user. Typical control knobs and selectors include but are not limited to gas and electric burner controls, gas and electric oven controls, lighting and timing controls, start and stop controls, switches, sliders, pushbuttons, wheels, levers, and various other functional controls associated with an appliance. "Selector" may also be used to refer to a programmed button selection on a touch-screen or similar operator interface.

The term "controller" or "processor" is used herein generally to describe various apparatus relating to the operation of the system and the appliances referred to herein. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), programmable logic controllers (PLCs), and field-programmable gate arrays (FPGAs).

A processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "Internet" or synonymously "Internet of things" refers to the global computer network providing a variety of information and communication facilities, consisting of interconnected networks using standardized communication protocols. The appliances, controllers and processors referred to herein may be operatively connected to the Internet.

It should be appreciated that all combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. The drawings are not necessarily to scale. Emphasis is instead generally placed upon illustrating the principles of the disclosure, wherein.

DETAILED DESCRIPTION OF THE INVENTION

Figure 1:
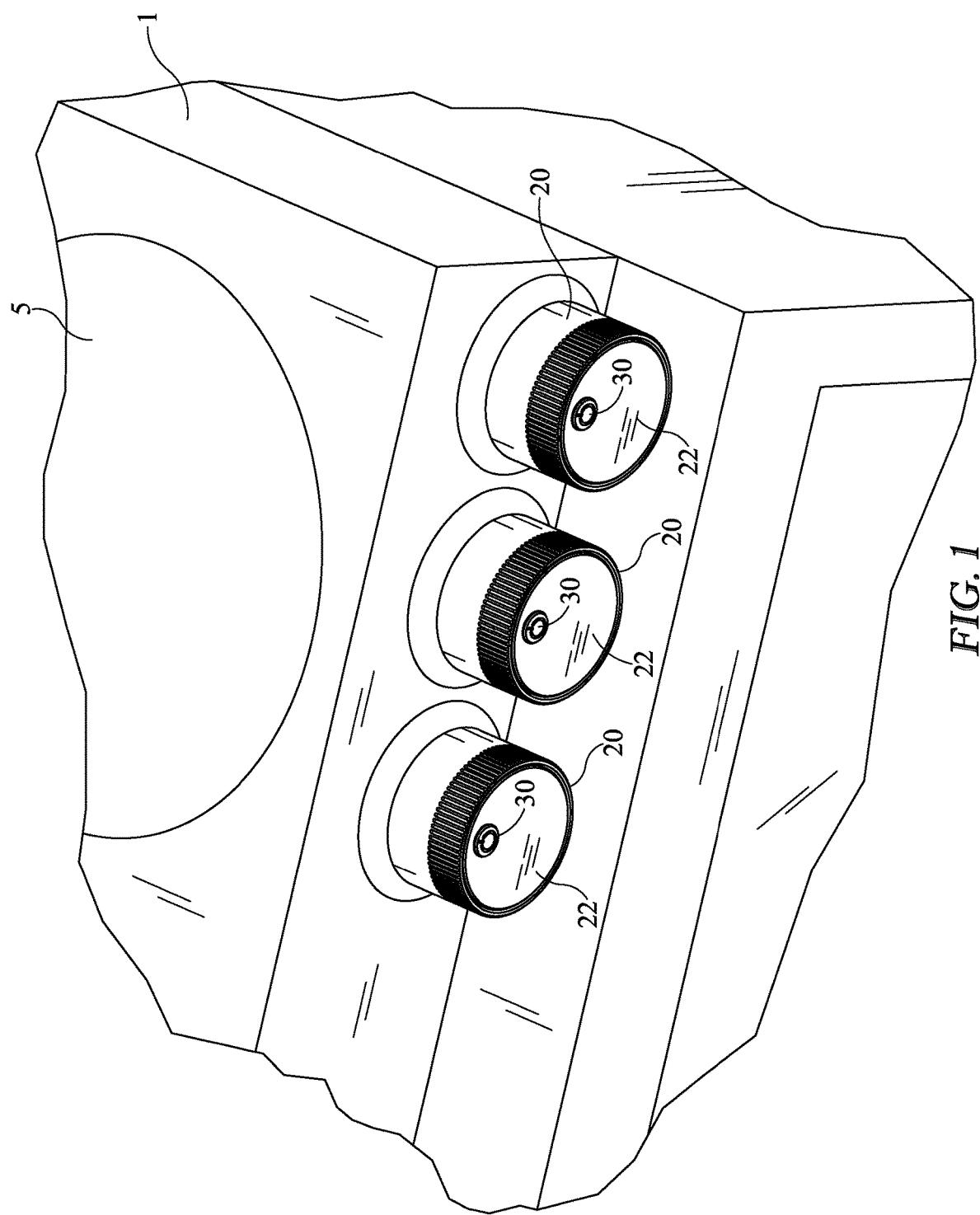
FIG. 1 is a perspective view of a gas appliance having a plurality of control knobs in accordance with various embodiments.
Figure 2:
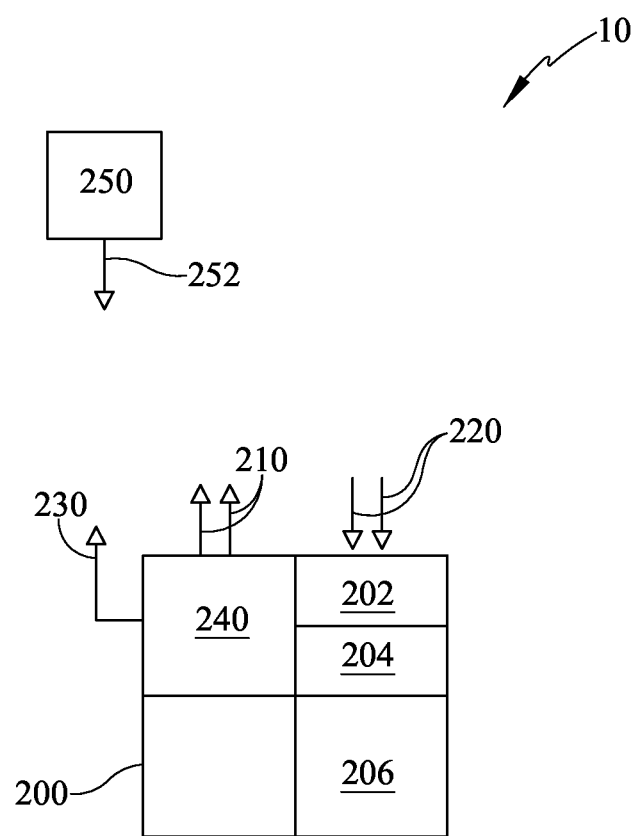
FIG. 2 is a block diagram of a control system that may be used in conjunction with an appliance in accordance with various embodiments.

Referring to drawing FIGS. 1 and 2, and in accordance with various aspects and embodiments of the invention, a system 10 for a two-step turn on for an appliance 1 gas control valve is described. In various embodiments the appliance 1 in which system 10 is implemented may include a controller 200 integral to appliance 1 that operates appliance 1 and implements various embodiments and aspects of system 10 as described herein.

FIG. 2 illustrates an exemplary appliance 1 hardware environment for implementing system 10 for two-step valve control and operation. The system 10 may include a controller 200, a processor or processors 202 and concomitant memory 204. Appliance 1 controller 200 may further comprise a plurality of signal outputs 210 and signal inputs 220 that may be operatively connected to a plurality of appliance 1 components to monitor and direct system 10 operation. Furthermore, in some embodiments controller 200 may include a wireless or hard-wired communications interface 230 that enables controller 200 to communicate with external devices or communications networks such as the internet, that may be integrated into system 10.

Additionally, controller 200 may be equipped with an operator or user interface 250 to provide audible or visual feedback to a user as well as provide a user the ability to provide instructions or commands to controller 200. Exemplary but non-limiting user interfaces 250 that may be employed include a mouse, keypads, touch-screens, keyboards, switches and/or touch pads. Any user interface may be employed for use in the invention without departing from the scope thereof. It will be understood that FIG. 2 constitutes, in some respects, an abstraction and that the actual organization of the components of appliance 1 and controller 200 may be more complex than illustrated.

The processor 202 may be any hardware device capable of executing instructions stored in memory 204 or data storage 206 or otherwise processing data. As such, the processor may include a microprocessor, field programmable gate array (FPGA), application-specific integrated circuit (ASIC), or other similar devices.

The memory 204 may include various memories such as, for example L1, L2, or L3 cache or system memory. As such, the memory 204 may include static random access memory (SRAM), dynamic RAM (DRAM), flash memory, read only memory (ROM), or other similar memory devices. It will be apparent that, in embodiments where the processor includes one or more ASICs (or other processing devices) that implement one or more of the functions described herein in hardware, the software described as corresponding to such functionality in other embodiments may be omitted.

The user interface 250 may include one or more devices for enabling communication with a user such as an administrator. For example, the user interface 250 may include a display, a mouse, and a keyboard for receiving user commands. In some embodiments, the user interface 250 may include a command line interface or graphical user interface that may be presented to a remote terminal via the communication interface 230.

The communication interface 230 may include one or more devices for enabling communication with other hardware devices. For example, the communication interface 230 may include a network interface card (NIC) configured to communicate according to the Ethernet protocol. Additionally, the communication interface 230 may implement a TCP/IP stack for communication according to the TCP/IP protocols. Various alternative or additional hardware or configurations for the communication interface 230 will be apparent.

The storage 206 may include one or more machine-readable storage media such as read-only memory (ROM), random-access memory (RAM), magnetic disk storage media, optical storage media, flash-memory devices, or similar storage media. In various embodiments, the storage 206 may store instructions for execution by the processor 202 or data upon with the processor 202 may operate. For example, the storage 206 may store a base operating system for controlling various basic operations of the hardware. Other instruction sets may also be stored in storage 206 for executing various functions of system 10, in accordance with the embodiments detailed below.

It will be apparent that various information described as stored in the storage 206 may be additionally or alternatively stored in the memory 204. In this respect, the memory 204 may also be considered to constitute a "storage device" and the storage 206 may be considered a "memory." Various other arrangements will be apparent. Further, the memory 204 and storage 206 may both be considered to be "non-transitory machine-readable media." As used herein, the term "non-transitory" will be understood to exclude transitory signals but to include all forms of storage, including both volatile and non-volatile memories.

While the controller 200 is shown as including one of each described component, the various components may be duplicated in various embodiments. For example, the processor 202 may include multiple microprocessors that are configured to independently execute the methods described herein or are configured to perform steps or subroutines of the methods described herein such that the multiple processors cooperate to achieve the functionality described herein.

Figure 3:
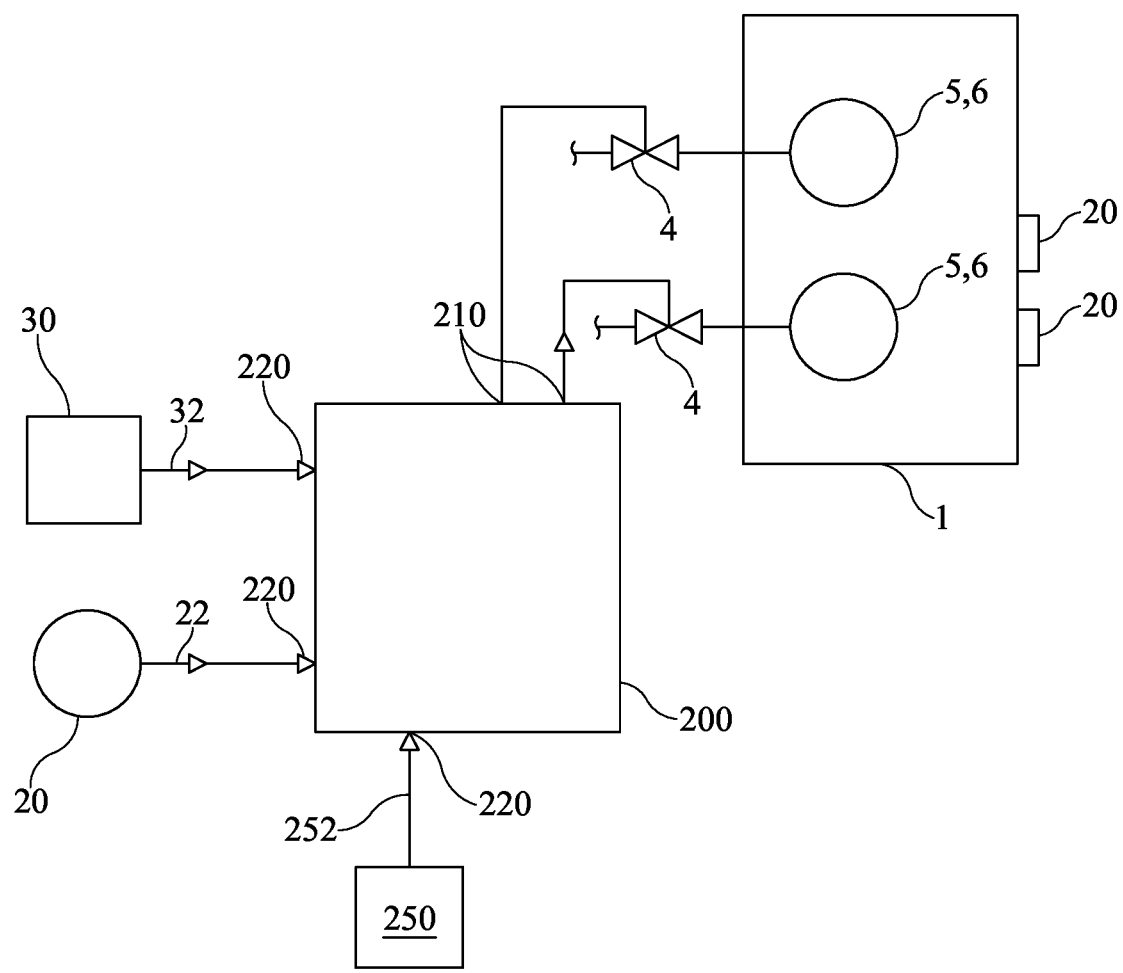
FIG. 3 is a block diagram of a valve control system in accordance with various embodiments.

Referring again to FIGS. 1-3, and in accordance with some embodiments, a system 10 for implementing a two-step gas valve turn-on for an appliance 1 includes a plurality of control knobs 20 (alternatively selector knobs 20), that are utilized to operate a plurality of digital gas valves of appliance 1. It should be understood that any appliance 1 or other device that utilizes control or selector knobs 20 wherein it would be desirable to implement a two-step initiation process may be implemented as part of system 10 without departing from the scope of the invention.

In one non-limiting exemplary embodiment for purposes of illustration in this specification, appliance 1 may be a conventional gas stove 1, (or equivalently a cooktop and oven combination). Stove 1 may include multiple control knobs 20, for example control knobs to adjust the flow of gas to a plurality of gas valves 4, and thus the heat output of a plurality of cooktop burners 5, as well as a plurality of oven heating elements or burners (not shown). In some aspects appliance 1 may include only one control knob that is assigned to individual valves 4 and concomitant burners 5. Other control knobs 20 for adjusting or operating various appliance 1 controls may also be present, but for purposes of explication have been omitted from this example. In one exemplary but non-limiting embodiment that will be used throughout this specification for purposes of explication, the control knobs 20 may be assumed to operate a plurality of gas valves 4, for example valves 4 supplying gas cooktop burners 5 and/or gas oven burners 5. In some aspects and embodiments control knobs 20 are turned or rotated clockwise to supply additional gas (and therefore heat) to a selected burner 5, and conversely turned counter-clockwise to reduce the amount of gas (and therefore heat) to a selected burner 5. In some aspects and embodiments control knobs may be rotated in a first direction to increase the open position of valve 4 and rotated in the opposite direction to reduce the open position of valve 4.

In some aspects of the invention the plurality of control knobs 20 may be mounted to or secured to a plurality of encoders that supply a plurality of inputs 220 to controller 200 representative of a desired gas valve 4 position (or burner 5 heat level), whereby controller 200 provides corresponding outputs 210 to control the plurality of gas valves 4.

In accordance with some aspects of the disclosure system 10 provides a plurality of two-step methods and concomitant apparatus for implementing a two-step turn on for a gas valve 4. In one exemplary embodiment appliance 1 includes at least one control knob 20 for setting a desired valve 4 position, or alternatively burner 5 power level. Throughout the specification gas valve 4 position and burner 5 power level and/or heat level will be referred to interchangeably. It should be understood that the position of a specified gas valve 4 will dictate the power level and/or heat level of that burner 5.

Control selectors 20 may include an output 22 that is representative of valve 4 position or power level, operatively coupled to an input of 220 of controller 200. Controller 200 will then supply, when conditions precedent are satisfied as discussed herein below, an output 210 representative of valve 4 position to valve 4, and/or an ignition output 210 to a valve igniter 6 to ignite valve 6 at a desired power level.

System 10 may further include a touch element 30 that must be touched, selected, depressed, or otherwise contacted or chosen by a user to activate a gas valve 4 assigned to a control knob 20. In some exemplary embodiments and aspects touch element 30 may be a capacitive touch sensor. In other embodiments touch element 30 may be a mechanical, electrical, or electro-mechanical switch. In some additional embodiments touch element 30 may be a programmed button or selection on operator interface 250 such that a user must select or touch the user interface in the prescribed method to activate gas valve 4.

In yet further aspects and embodiments, operator interface 250 may include a voice recognition module that may be programmed to operate in place of touch sensor 30, for example to recognize a specific voice or voices. In these embodiments voice recognition module may include an output 252 operatively coupled to processor 200 that is provided when a predetermined voice is detected by module 250. In these embodiments, a specific vocal command such as "burner on", "activate burner", or "ignite", may be pre-programmed by a user to cause processor to provide an output 210 to valve 4 actuators to operate valves 4 responsive to a control knobs 20 position.

In yet further aspects and embodiments, and as best depicted in FIG. 1, control knobs 20 may include a separate touch-sensitive button 30 disposed in a front surface 22 of knob 20 that may incorporate aspects of access control for an appliance. Each touch sensitive button 30 may provide an input 220 to processor 200 to indicate its selection by a user. In one exemplary embodiment, a user may initiate valve 4 operation and/or ignition by simultaneously touching or selecting the touch-sensitive button 30 on a specific selector 20 and rotating the selector to a desired burner power level. In an exemplary embodiment where appliance 1 is a stove, oven, or cooktop, the selected burner 4 ignitor is then provided an output 210 from controller 200 and valve 4 is provided an output 210 representative of desired valve 4 position, thereby igniting and setting the burner heat level.

In accordance with some embodiments, in operation, operator interface 250 may be provided with suitable programming instructions to depict or represent a touch button or selector 30 that operates just as a mechanical switch would. When operator interface 250 switch 30 is selected and valve selector 20 has been turned, processor 200 provides an output 220 to valve 4 and ignitor 6 to operate burner 5.

In some aspects and embodiments of the invention control selector 20 must be first be turned to a desired burner 5 power level prior to a user touching or depressing the touch sensor 30 in order for processor 200 to initiate ignition of burner 5 at the desired power level. In some embodiments wherein control selector 20 is a rotatable knob, control selector may be turned in either direction to set the predetermined power level of burner 5. In these aspects and embodiments burner 5 may be turned off by simply touching or activating touch sensor 30.

In some additional aspects and embodiments of the invention touch sensor 30 must be touched or activated prior to control selector 20 being turned to a desired burner 5 power level in order for processor 200 to initiate ignition of burner 5 at the desired power level. In some embodiments wherein control selector 20 is a rotatable knob, control selector may be turned in either direction, either clockwise or counter clockwise, to set the predetermined power level of burner 5. In these aspects and embodiments burner 5 may be turned off by simply touching or activating touch sensor 30.

In accordance with additional aspects and embodiments of the invention a single control selector 20 or knob may be utilized to operator a plurality of valves 4 and concomitant burners 5. In these embodiments user interface 250 may be suitably programmed such that a user may choose a burner 5 to be controlled via a selection graphic or button on the operator interface. The user may the operate burner 5 according to the system and method described herein. In other aspects a single touch sensor 30 may be provided in conjunction with appliance 1 or user interface 250, wherein the touch sensor is operable to control the ignition of a burner 5 that is selected through the use of operator interface 250. In yet further embodiments where a single control selector 20 is employed, each burner 5 may include a dedicated touch sensor 30 to initiate ignition thereof as described herein.

In a yet further embodiment, control selector or knob 20 may include an electromechanical switch that is actuated responsive to pushing in or depressing selector 20 so that a user must push in or "click" control selector 20 prior to selecting a power level for burner 5 by rotating selector 20. In this embodiments the electromechanical switch includes an output operatively coupled to an input of controller 200 that indicates that a user is ready to light a selected burner 5. Alternatively, control selector 20 may be rotated to a desired power level prior to pushing in or clicking selector 20 to ignite burner 5.

While a variety of inventive embodiments have been described and illustrated herein, those of ordinary skill in the art will understand that a variety of other methods, systems, and/or structures for performing the function and/or obtaining the results, and/or one or more of the advantages described herein are possible, and further understand that each of such variations and/or modifications is within the scope of the inventive embodiments described herein. Those skilled in the art will understand that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A system for a two-step activation for a plurality of gas cooktop burners having associated valves and ignitors, wherein the valves are digital gas valves that are electrically actuated to control output level, the system comprising:
   a plurality of control selectors associated with and assigned to the plurality of gas cooktop burners and having respective outputs representative of valve positions of the valves for the associated gas cooktop burners;
   a touch sensor having an output representative of a permission to operate any of the plurality of gas cooktop burners; and
   a controller coupled to the plurality of control selectors and the touch sensor, the controller configured to control the associated valve and the associated ignitor for a selected gas cooktop burner among the plurality of gas cooktop burners to ignite the selected gas cooktop burner in response to a two-step activation sequence initiated in response to user input directed to the touch sensor and to the associated control selector for the selected gas cooktop burner, wherein the controller is further configured to, in response to the two-step activation sequence, electrically actuate the associated valve of the selected gas cooktop burner to control a position of the associated valve within a range of positions and thereby control a flow rate of gas through the associated valve and the output level of the selected gas cooktop burner in response to an electrical signal representative of a position of the associated control selector of the selected gas cooktop burner.

2. The system of claim 1, wherein the controller is further configured to, in response to the two-step activation sequence, actuate the associated ignitor of the selected gas cooktop burner while the electrically actuating the associated valve of the selected gas cooktop burner to ignite the selected gas cooktop burner.

3. The system of claim 1, wherein each control selector comprises a rotatable control knob having an output representative of a desired valve position.

4. The system of claim 1, wherein the touch sensor comprises a capacitive sensor.

5. The system of claim 1, wherein the touch sensor comprises a mechanical switch.

6. The system of claim 1, wherein the touch sensor comprises an electromechanical switch.

7. The system of claim 1, wherein the touch sensor comprises an electromechanical switch that is activated by depressing a control selector.

8. The system of claim 1, further comprising a user interface operatively coupled to the controller, wherein the touch sensor is a selection provided on the user interface.

9. The system of claim 8, wherein the user interface comprises a selection that enables a specified control selector to be assigned to a specified valve.

10. The system of claim 1, wherein the touch sensor is mounted on a surface of a cooking appliance.

11. The system of claim 1, wherein the associated control selector for the selected gas cooktop burner is a rotatable knob, and the two-step activation sequence includes rotation of the rotatable knob to a predetermined position representative of a desired position of the valve for the selected gas cooktop burner prior to the actuation of the touch sensor.

12. The system of claim 1, wherein the associated control selector for the selected gas cooktop burner is a rotatable knob, and the two-step activation sequence includes actuation of the touch sensor prior to rotating the rotatable knob to a predetermined position.

13. The system of claim 1, wherein the controller is configured to select the selected gas cooktop burner in response to user input, and to shut off the selected gas cooktop burner in response to activation of the touch sensor when the selected gas cooktop burner is active.

14. The system of claim 1, further comprising a plurality of additional touch sensors disposed proximate associated control selectors among the plurality of control selectors, wherein the controller is configured to shut off the selected gas cooktop burner in response to activation of the additional touch sensor disposed on the associated control selector for the selected gas cooktop burner when the selected gas cooktop burner is active.

15. The system of claim 1, wherein the two-step activation sequence includes simultaneous user input directed to the touch sensor and to the associated control selector for the selected gas cooktop burner.

16. A cooking appliance, comprising:
   a plurality of gas cooktop burners having associated valves and ignitors, wherein the valves are digital gas valves that are electrically actuated to control output level;
   a plurality of control selectors associated with and assigned to the plurality of gas cooktop burners and having respective outputs representative of valve positions of the valves for the associated gas cooktop burners;
   a touch sensor having an output representative of a permission to operate any of the plurality of gas cooktop burners; and
   a controller coupled to the plurality of control selectors and the touch sensor, the controller configured to control the associated valve and the associated ignitor for a selected gas cooktop burner among the plurality of gas cooktop burners to ignite the selected gas cooktop burner in response to a two-step activation sequence initiated in response to user input directed to the touch sensor and to the associated control selector for the selected gas cooktop burner while a different gas cooktop burner is active, wherein the controller is further configured to, in response to the two-step activation sequence, electrically actuate the associated valve of the selected gas cooktop burner to control the output level of the selected gas cooktop burner in response to an electrical signal representative of a position of the associated control selector of the selected gas cooktop burner.

17. The cooking appliance of claim 16, wherein the controller is further configured to, in response to the two-step activation sequence, actuate the associated ignitor of the selected gas cooktop burner while the electrically actuating the associated valve of the selected gas cooktop burner to ignite the selected gas cooktop burner.

18. The cooking appliance of claim 16, wherein the associated control selector for the selected gas cooktop burner is a rotatable knob, and the two-step activation sequence includes rotation of the rotatable knob to a predetermined position representative of a desired position of the valve for the selected gas cooktop burner prior to the actuation of the touch sensor.

19. The cooking appliance of claim 16, wherein the associated control selector for the selected gas cooktop burner is a rotatable knob, and the two-step activation sequence includes actuation of the touch sensor prior to rotating the rotatable knob to a predetermined position.

20. The cooking appliance of claim 16, wherein the two-step activation sequence includes simultaneous user input directed to the touch sensor and to the associated control selector for the selected gas cooktop burner.

\* \* \* \* \*